Aug. 10, 1954

N. I. KORMAN 2,686,232

AMPLIFIER

Filed Sept. 30, 1948

Inventor

NATHANIEL I. KORMAN

By Philip G. Cooper

Attorney

Patented Aug. 10, 1954

2,686,232

UNITED STATES PATENT OFFICE 2,686,232

AMPLIFIER

Nathaniel I. Korman, Merchantville, N. J., assignor to Radio Corporation of America, a corporation of Delaware Application September 30, 1948, Serial No. 52,065

3 Claims. (Cl. 179—171)

This invention relates to high frequency signal amplification systems, particularly to those systems in which electron discharge tubes are connected to provide a high gain over a frequency band wide enough to carry a good video signal.

For the amplification of wide-band high frequency signals in electron-discharge tube amplifier stages, a relatively high degree of isolation is needed between the input and output. With even a small amount of capacitive coupling between them, difficulties arise because of the undesired feedback of signals from the output to the input. The inherently low output-to-input capacitance of the pentode type of electron-discharge tubes renders these tubes suitable for this operation. However the larger number of electron-discharge electrodes in pentodes, introduces more undesired noise into the signals being amplified.

It has accordingly been suggested by Sziklai and Schroeder in their article in the October 1945 issue of the Proceedings of the I. R. E., pages 701–709, to couple together two electron-discharge triodes so that the incoming signals are supplied to one section and the amplified output taken from the other section thereby reducing the output-to-input feedback capacitance. Also by operating one of the grids at ground potential, a sufficiently high isolation is provided to make practical high frequency wide-band amplifiers of low noise characteristics. However this has heretofore been possible only at the expense of a reduction in available gain.

Among the objects of the present invention is the provision of novel amplification systems which furnish the desired wide-band high gain characteristics with electron discharge tube units having a minimum number of separately connected electrodes.

Further objects of the invention includes the provision of twin-triode types of electron-discharge amplification systems having a gain comparable to the best available pentode amplifiers, but having the advantage of introducing less noise into the signal being amplified.

Figure 1:
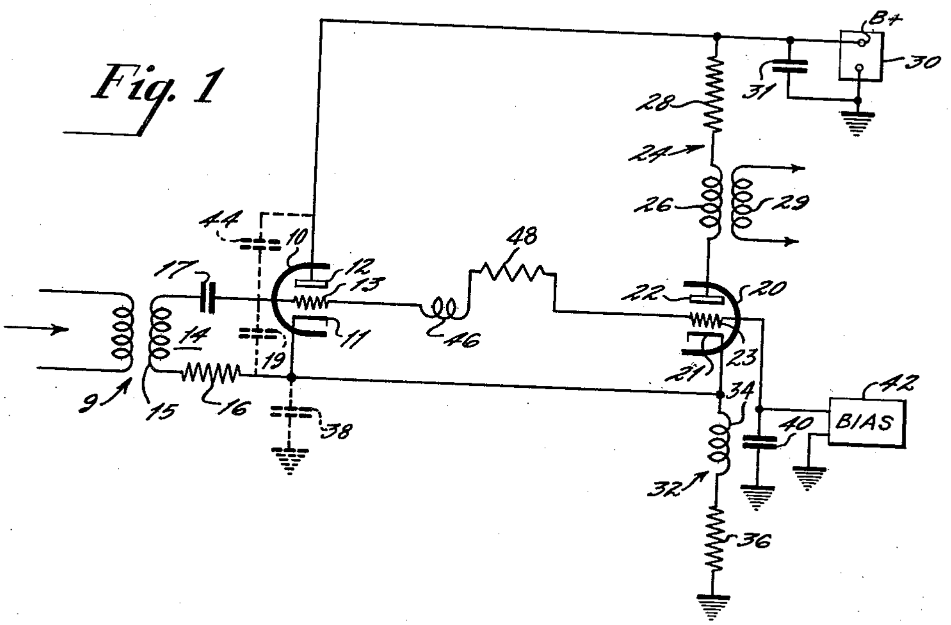
Figure 2:
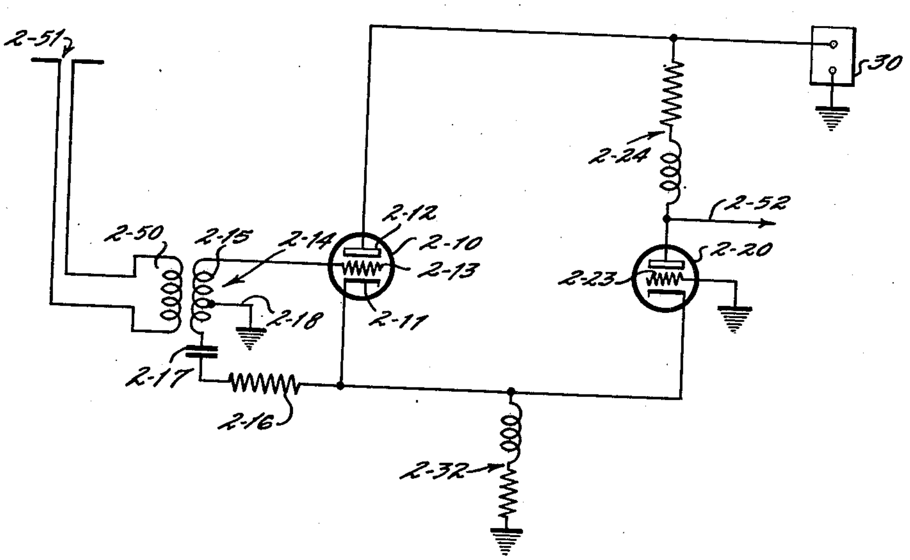

The above as well as other objects of the invention will be best understood from the following description of exemplifications thereof, reference being had to the accompanying drawings wherein:

Fig. 1 is a circuit diagram of one form of amplification system embodying the invention; and Fig. 2 is a circuit diagram of a different modification of the invention.

According to the invention, the system utilizes a pair of cathode-coupled cascaded triode electron-discharge amplification sections in which the signals are introduced into the first section, amplified and passed to the second section which is of the grounded-grid type, and there further amplified. The signal input is connected directly between the grid and cathode of the first section to provide wide-band amplification with an overall gain at least about as high as is possible in a conventional pentode section. The first section is preferably connected to overcome the gain-diminishing effect of interelectrode capacitances by tuning out or otherwise decreasing the effect of such capacitances.

Fig. 1 shows one form of the invention. A first electron-discharge section 10 and a second electron-discharge section 20, each comprises an electron-emissive electrode or cathode, 11, 21, an electron collecting electrode or plate 12, 22, and a control electrode or grid 13, 23 for controlling the passage of electrons from each cathode to its plate in accordance with the instantaneous potential of each grid with respect to its cathode, as is well known. The electron discharge is energized by the D.-C. plate or anode current source 30 the positive terminal (B+) of which is connected to the plates or electron collecting electrodes 12, 22 and the negative terminal to the cathodes 11, 21 as by means of the ground connections shown. Where the signal impedance of the source 30 is not low enough a by-pass condenser 31 is connected across its output terminals to provide low impedance for signal voltages.

Incoming signals are supplied to the first section 10 by an input circuit 14 connected directly between the grid 13 and cathode 11. The input circuit is shown as an inductance 15 and a resistance 16 in series, connected to the grid 13 through a D.-C. blocking capacitor 17. To provide the desired band-pass response the input circuit is adjusted to form a damped parallel circuit, as by tuning the inductance with a suitable capacitance to the mid-frequency of the band. The tuning capacitance, indicated by the dash lines 19, may be provided in any suitable manner such as by utilizing the grid-to-cathode capacitance of tube section 10 and/or the distributed capacitance of the inductance 15 where the inductance is lumped in the form of turns of a conductor, or by the incorporation of an actual capacitor. Damping of the circuit, shown as provided by the series resistance 16, may also be accomplished by connecting a resistor in parallel with the tuned circuit elements.

The instantaneous signal voltages appearing between grid 13 and its cathode 11 cause corresponding variations in the electron-discharge or plate current through section 10. As a result similar signal variations appear across the cathode loading impedance 32 shown in the form of an inductance element 34, together with a resistor 36, establishing a series cathode return circuit for both cathodes 11 and 21 to the negative or low voltage side of the energizing source 30. The cathode load 32 may also be arranged as a damped parallel resonant circuit as by tuning the inductance with the stray capacitance between cathode and ground, represented at 38, and/or with its own distributed capacitance if it is in the form of lumped turns of a conductor.

Both cathodes 11 and 21 are connected together so that the load 32 is common to the cathodes of both triode sections 10, 20. This so-called cathode coupling causes the signals put out by the first section 10, to appear between the ground conductor and the cathode 21. By holding the grid 23 of the second section 20 at ground potential with respect to the signal frequencies, the coupled signals appear between cathode 21 and grid 23 and effect a corresponding control action on the electron flow in the second section. A load circuit 24 inserted in the connection to plate 22 accordingly develops voltage changes which are essentially amplifications of the input signal voltages. The plate load circuit 24 may be generally similar to the other loading circuits 14, 32 and may consist of a corresponding damped resonant circuit including inductance 26 and resistance 28. To keep any signals from being developed in the energizing means 30, its terminals may be by-passed by a capacitance indicated at 31.

Grounding of the grid 23 for signal voltages, may be provided as by a simple ground connection, or by the grounded by-pass capacitor 40 as shown. The use of a by-pass capacitor 40 as in Fig. 1 enables a D.-C. bias voltage to be applied to the grid 23 with respect to its cathode, for controlling the gain of the section in any well-known manner. As shown in this figure, a source of bias voltage 42 is employed. This source may conveniently be a network which derives a D.-C. voltage controlled in any conventional manner (not shown) by the amplitude of the signal received or delivered by the stage or by any of a plurality of prior or subsequent cascaded stages. The voltage of source 42 is added algebraically to any D. C. voltage between cathode and ground produced by the passage of plate current through the cathode resistance, to determine the actual grid-to-cathode bias.

An important advantage of the invention is the direct connection of the signal input circuit to the grid and cathode of the first electron-discharge tube unit. In this manner incoming signals are directly impressed between these electrodes so that no attenuation is produced by intervening circuit elements. Furthermore inasmuch as the cathode load 32 develops signal voltages which cause the cathode 11 to follow the voltage changes of grid 13, there is an inherent degeneration of any incoming signals which may be applied between the grid of the first unit 10 and ground. In the construction of Fig. 1 this is apparent from the fact that such cathode-to-ground voltages are in phase with, and are subtracted from, the grid-to-ground voltages to determine the grid-to-cathode or control voltage.

However this degeneration is a minimum when the desired incoming signals are directly applied between grid and cathode as shown. With this arrangement voltage changes of the cathode 11 with respect to ground do not appreciably affect the grid-cathode potentials.

Due to the fact that the grid and cathode of section 10 are both floating above ground potential, the inherent gride-plate interelectrode capacitance of section 10, represented by the dash-line capacitor 44, may have an appreciable gain-diminishing effect. Since plate 12 is grounded for signal frequencies, as by B+ by-pass condenser 31, this plate is effectively connected to the grounded side of the cathode load 32. Without the capacitance 44, the cathode load 32 has only one connection to the input circuit at cathode 11. Capacitance 44 may be considered as completing a feedback connection from the cathode load to the input returning signals opposite in phase to the incoming signals. The above gain-diminishing effect may be reduced by decreasing signal transfer through the grid-plate capacitance.

In the form of the invention shown in Fig. 1 the effect of the grid-to-plate capacitance circuit is reduced by raising the circuit impedance. This is accomplished by including the capacitance with inductive impedance in a parallel-resonant circuit tuned to the signals being amplified, as shown in Nichols 1,325,879 December 23, 1919. The added inductance may be connected through a suitable blocking capacitor directly between grid 13 and plate 12 or between grid 13 and any other member which is effectively at ground potential with respect to the signal frequencies. As shown, a tuning inductance 46 is connected between grid 13 and grounded-grid 23. The inductive impedance connection may include resistance either in parallel or in series, as indicated at 48 to broaden the resonance. Lumped or distributed inductances may be utilized.

A feature of the inductance connection to grid 23 is that this inductance simultaneously establishes a return circuit for grid 13 thereby providing the connection necessary for the maintenance of suitable bias between grid 13 and its cathode. If desired, the bias supply 42 may be omitted so that only the voltage drop across the cathode return circuit 32 supplies the grid biasing of the stages. By-pass capacitor 40 should also be omitted in this variation inasmuch as a direct grid return to ground is all that is required.

In actual use the system of Fig. 1, with electron-discharge tubes of the 6J6 type in which two triodes corresponding to sections 10 and 20 are mounted in a single tube envelope, has been found to provide an overall gain about 20 percent higher than the highest gain presently available with a pentode high-frequency wide-band stage of amplification. Furthermore the undesired noise injection of the amplifier system of the invention is much lower than that of pentodes apparently because of the elemination of the separately connected extra electron discharge electrodes.

The input circuit 14 may have its inductance 15 inductively coupled with a signal supply, as by connecting the inductance 15 as the secondary of a coupling transformer 9. The amplified output may be derived from the plate-loading circuit 24 as by inductively coupling the plate inductance 26 with a second inductance 29 to form an output transformer.

Fig. 2 shows a modified form of the invention.

This form is generally similar to that shown in Fig. 1. Two triode electron-discharge sections 2—19, 2—20 are here shown as incorporated in separate tubes with their cathodes coupled through a common cathode return circuit 2—32. Grid 2—23 of the second stage 2—20 is directly grounded. Input circuit 2—14, is connected directly between grid 2—13 and cathode 2—11 to make the fullest use of incoming signals and provide maximum gain.

Fig. 2 also shows another technique for decreasing the gain-diminishing effect of the inherent grid-plate capacitance. The input circuit 2—14 includes inductance 2—15 across which incoming signals are supplied and this inductance is provided with a grounded tap 2—18. The ground tap can be considered as effectively tying the input circuit to ground and thereby reduces the capacitance to ground which it would otherwise have if completely floating, as in the construction of Fig. 1. By properly locating the D.-C. grid blocking capacitor 2—17, the ground tap 2—18 may also be arranged to establish a return and/or bias connection for grid 2—13. This is accomplished by inserting the blocking capacitor 2—17 in any desired portion of the cathode connection of the inductance 2—15, between this inductance and a loading resistance 2—16 for example.

The inductance 2—15 may be arranged to receive incoming signals by inductive or magnetic coupled with another inductance 2—50 carrying the desired incoming signals. The amplified output may be similarly taken from a plate loading circuit 2—24 in the plate connection of the second section 2—20, or it may be derived in any other suitable manner such as by capacitive coupling to a portion of the plate load. A take-off connection 2—52 at the high-signal-potential side of the plate load is especially suitable.

A particular advantage of the construction of Fig. 2 is its combination with an antenna of the balanced type such as the dipole 2—51. Not only is the noise level kept low by reason of the fact that triode electron-discharge sections are used in the first amplification stage where the signal level is low and the noise injection is critical, but in addition the construction shown functions to diminish the noise level due to undesired pick-up in the antenna. These signals to which the balanced antenna is not resonant are developed essentially between the antenna and ground and, when induced in the secondary 2—15 of the input transformer, return to ground through the tap 2—18. Such transfer of undesired signals causes them to produce signal currents in inductance 2—15 which pass in opposite directions from its ends to its ground tap and can be made to balance against each other so that they cancel each other and are substantially absent from the amplified output.

The ground tap 2—18 may be at the mid-point of inductance 2—15 or it may be displaced somewhat in either direction from this point. Adjustability may be incorporated for setting in the position providing the desired overall performance. Some resistance or inductance included in the ground tap return improves the overall gain.

The various load circuits may have their damping resistors connected in parallel or in series with the resonant circuits. Additionally capacitances may be deliberately inserted in these circuits for tuning the inductances, as where the signals to be amplified do not cover very wide bands and the maximum L/C ratio is not required. For the amplification of signals in the television bands, it is generally preferred to have minimum capacitance, but where capacitance is to be added, it may very simply be effected by merely bringing into close proximity those conductors between which additional capacitance is desired.

The features of the invention are also suitable for inclusion in a two-way amplifier arrangement where additional signals are supplied to grid 23 or 2—23 with respect to its cathode or with respect to ground. As described in the above-mentioned Sziklai and Schroeder article, if the additional signals are far enough removed from the principal signal band, they are also amplified and delivered to the plate of the first section from which they may be recovered by inserting a load circuit in the connection to this plate. The input and output loads of each of the signals are arranged to be of negligible impedance to the other signal. The additional signals may also be arranged to modulate the gain of the second section to thereby cause heterodyning or mixing of the signals and supply a beat signal output for intermediate frequency channels.

The gain-diminishing effect of the undesired grid-plate capacitance of the first amplification section may be counteracted by other techniques such as neutralization of this capacitance.

While several exemplifications of the invention have been indicated and described above, it will be apparent to those skilled in the art that other modifications may be made without departing from the scope of the invention as set forth in the appended claims.

What is claimed is:

1. In a high frequency amplifier system for amplifying a broad band of high frequency signals, an amplifying device having a control electrode, an electron collecting electrode and an electron emissive electrode, an ungrounded input circuit responsive to said band connected between said control electrode and said emissive electrode, a load impedance circuit responsive to said band connected between said emissive electrode and a point of ground potential, said collecting electrode being energized by a source of direct-current potential and effectively grounded for said band of signals, said device being characterized by a substantial capacitance between said collecting and control electrodes that completes a degenerative feedback path for said band between said load impedance circuit and said input circuit with a resultant gain-diminishing effect, impedance means comprising an inductor connected effectively between said input electrode and said point of ground potential for substantially overcoming said gain-diminishing effect of said capacitance, said impedance means being connected effectively in shunt relation with said capacitance and of such value that it resonates broadly with said capacitance to said band, and a second amplifying device having control, collecting and emissive electrodes coupled to said first named device, said emissive electrodes of said devices being directly connected together and said control electrodes of said devices being conductively connected through said inductor, said second named control electrode being effectively grounded for said band of signals.

2. The invention as set forth in claim 1 wherein a bias source is connected between ground and said second-named control electrode for biasing same and, through said inductor, said first-named control electrode.

3. In a high frequency amplifier system for amplifying a band of signals, first and second amplifying devices each having a control electrode, an electron collecting electrode and an emissive electrode, an input circuit responsive to said band connected between said input electrode and said emissive electrode of said first device, a load impedance circuit responsive to said band connected between said emissive electrode of said first device and a point of ground potential, said collecting electrode of said first device being energized by a source of direct current potential and effectively grounded for said band of signals, said first device being characterized by a substantial capacitance between said collecting and control electrodes that completes a degenerative feedback path between said load impedance circuit and said input circuit with a resultant gain-diminishing effect, said second device having its emissive electrode direct-connected to said emissive electrode of said first device, its control electrode effectively grounded for said band of signals and an output circuit connected to its collecting electrode, and inductive impedance means connected between said control electrodes of said devices and being of such value as to resonate with said capacitance to said band for substantially nullifying the gain diminishing effect of said capacitance.

References Cited in the file of this patent

UNITED STATES PATENTS

| Number | Name | Date |
|---|---|---|
| 2,255,882 | Hathaway et al. | Sept. 16, 1941 |
| 2,276,565 | Crosby | Mar. 17, 1942 |
| 2,319,139 | Koch | May 11, 1943 |
| 2,419,812 | Bedford | Apr. 29, 1947 |
| 2,441,127 | Atkins | May 11, 1948 |
| 2,460,907 | Schroeder | Feb. 8, 1949 |
| 2,549,761 | Adams | Apr. 24, 1951 |

FOREIGN PATENTS

| Number | Country | Date |
|---|---|---|
| 492,407 | Great Britain | Sept. 20, 1938 |